United States Patent [19]

Maesing et al.

[11] Patent Number: 5,494,316
[45] Date of Patent: Feb. 27, 1996

[54] MOTOR VEHICLE REAR SEAT SAFETY BELT ARRANGEMENT

[75] Inventors: Alfons Maesing, Wimsheim; Rainer Kneip, Eberdingen, both of Germany

[73] Assignee: Dr. Ing. h.c.F. Porsche AG, Germany

[21] Appl. No.: 318,163

[22] Filed: Oct. 5, 1994

[30] Foreign Application Priority Data

Oct. 5, 1993 [DE] Germany .......................... 43 33 873.9

[51] Int. Cl.⁶ .................................................. B60R 22/18
[52] U.S. Cl. ........................................ 280/808; 296/68.1
[58] Field of Search ........................... 280/808, 801.1; 297/483; 296/68.1

[56] References Cited

U.S. PATENT DOCUMENTS

| | | | |
|---|---|---|---|
| 3,885,810 | 5/1975 | Chika | 296/68.1 |
| 3,961,807 | 6/1976 | Maki et al. | |
| 5,020,356 | 6/1991 | George | 280/808 |
| 5,207,453 | 5/1993 | Stedman et al. | 280/808 |

FOREIGN PATENT DOCUMENTS

| | | | |
|---|---|---|---|
| 0364131A3 | 4/1990 | European Pat. Off. | |
| 3613830 | 10/1987 | Germany | 280/808 |
| 4001119A1 | 7/1991 | Germany | |
| 2-151548 | 6/1990 | Japan | 280/808 |
| 4-303054 | 10/1992 | Japan | 280/808 |
| 5-112205 | 5/1993 | Japan | 297/483 |

*Primary Examiner*—Karin L. Tyson
*Attorney, Agent, or Firm*—Evenson, McKeown, Edwards & Lenahan

[57] ABSTRACT

A safety belt for a rear seat system of a motor vehicle includes three-point belts. Upper deflector points, provided at shoulder level of the back-seat passengers, are mounted on a deflector element disposed next to the middle of the vehicle. In order to be able to provide three-point belts in the region of the rear seat system in a motor vehicle which has a folding convertible top such that the belts are usable without restriction in both the open (folded) and the closed (unfolded) positions of the convertible top, a support frame is disposed between the side-by side-seats of the rear seat system. Deflector elements provided at shoulder level of the back-seat passengers are mounted on this support frame.

9 Claims, 9 Drawing Sheets

MOTOR VEHICLE REAR SEAT SAFETY BELT ARRANGEMENT

BACKGROUND AND SUMMARY OF THE INVENTION

The present invention relates to a safety belt arrangement for a rear seat system of a motor vehicle, and more particularly, to an arrangement comprising diagonal belts on outer sides of seats of the rear seat system, and having belt straps guided by respective deflector elements disposed approximately at shoulder level of passengers who utilize the rear seat system, the deflector elements being adjacent to a longitudinal center plane of the vehicle.

German Patent Document DE 40 01 119 A1 describes a continuous rear bench seat for a closed motor vehicle, with three-point belts provided on the rear bench seat for the back-seat passengers. The upper belt points, provided approximately at shoulder level for the back-seat passengers, are in the form of deflector elements which are secured adjacent to the vehicle center on the continuous rear bench seat and are secured to the body.

An object of the present invention is to provide, in a convertible top motor vehicle and in the region of the rear seat system of the vehicle, that both seats in the rear seat system can be equipped with a three-point belt, such that the safety belts can be used without limitation both in the open (unfolded) position and the closed (folded) position of the convertible top.

This object has been achieved in accordance with the present invention by providing a support frame protruding upward past and between the rear seats which are located side-by-side, with the upper deflector elements of the safety belt arrangements being mounted on the support frame.

The main advantages attained with the present invention are the disposition of a supporting frame between the two seats of the rear seat system, and with the upper deflector elements provided on it. As a result, three-point belts for both rear seats can be used without limitation in both the open position of the convertible top, when it is folded back, and in the closed position thereof.

The support frame of the present invention has a stable structure and is capable of absorbing major forces. It is also simple to manufacture and can easily be retrofitted into existing convertibles. Mounts for the two lower belt winders, and adjustable locking bolts for locking the two seat backs in their position for use and lower bearing segments for the seat backs are further integrated into the support frame.

BRIEF DESCRIPTION OF THE DRAWINGS

These and further objects, features and advantages of the present invention will become more readily apparent from the following detailed description of a currently preferred embodiments when taken in conjunction with the accompanying drawings wherein.

DETAILED DESCRIPTION OF THE DRAWINGS

Figure 1:
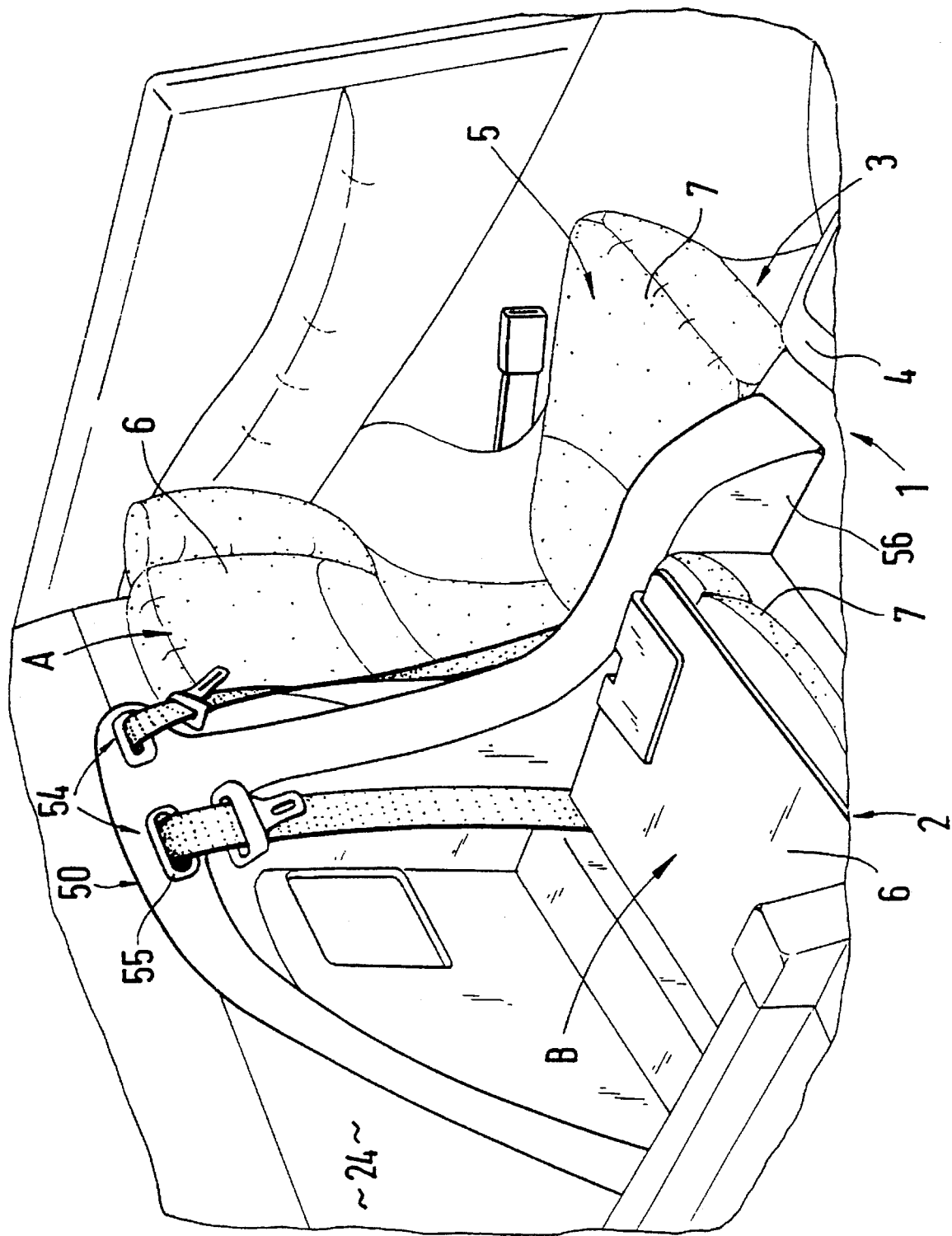
FIG. 1 is a perspective front view of a rear seat system of an open convertible motor vehicle (i.e., top folded back) with the covered support frame, with the right seat back in its position for use and the left seat back folded down.

FIG. 1 shows a rear seat system 1 of a convertible passenger motor vehicle (not shown in further detail), which above its belt line has a folding convertible top that can be moved from a closed position into an open position at the rear of the car, and vice versa in a well known manner. The rear seat system 1 includes two side-by-side seats 2, 3 for back-seat passengers. A longitudinally extending raised tunnel 4 which is part of the car body runs between the seats 2, 3.

Each seat 2, 3 is composed of a fixed seat portion 5 and a seat back 6. The seat portion 5 includes a seating depression as part of the body of the vehicle, and a seat cushion 7 is inserted into the depression. The two seat backs 6 are separate from one another, as viewed in a crosswise direction of to the vehicle, and are pivotably supported so that, as needed they can be folded down from an upright position for use A (right side of FIG. 1) into a position of repose B, in which they rest on the respective seat cushions 7 (left side of FIG. 1). The seat backs 6 may, however, also be rigid, i.e. non-pivotable. To restrain a back-seat passenger, a portion of whom is shown in dot-dash line in FIG. 2, a safety belt arrangement designated generally by numeral 8 is provided which in the illustrated embodiment is formed by one three-point belt 9 for each seat 2, 3.

Each three-point belt 9 extends, initially essentially horizontally in the form of a lap belt 10 over the lap region of the back-seat passenger, from a lower securing point provided on the tunnel 4 to a deflector fitting or element 12 that is snapped into a belt lock 11 on the opposite side of the seats 2, 3. From there, the band or strap of the belt 9 is extended onward essentially diagonally over the upper body of the back-seat passenger, in the form of a diagonal shoulder belt 13, to a deflector element 14 mounted approximately at shoulder level. Beyond the deflector element 14, a segment 15 of the belt strap extends vertically downward and cooperates at its free end with a belt winder 16 of known construction. The belt lock 11 is retained at a securing point on the floor or on the side wall of the vehicle body, adjacent the outer longitudinal side of the vehicle.

According to the present invention, a support frame 17, to which the upper deflector elements 14 of the safety belt arrangement 18 are mountable, is provided between the seats 2, 3 of the rear seat system 1, that is specifically between the split seat backs 6 located next to one another.

The support frame 17 includes an approximately U-shaped tubular yoke 18 extending transversely of the vehicle behind the two seat backs 6. The yoke is composed of an upper, transversely extending crossbar 19, and two legs 20 extending obliquely downward and outward. The lower ends 21 of the two legs 20 are permanently connected to a transversely extending securing plate 22. The crossbar 19 is slightly curved, as seen both in the front view and the side view.

The securing plate 22 is adapted to the contour of a bottom segment 23, extending transversely therebeneath, of a back wall 24 and is connected to the bottom segment 23 by a plurality of securing screws 25. In the region of the securing screws 25, the bottom segment 23 has reinforcements and threaded nuts (not shown), into which the securing screws 25 can be inserted. Midway along its crosswise length, the securing plate 22 is provided with a downward-pointing offset 26.

In the illustrated embodiment, the deflector elements or fittings 14 are annular belt eyelets 27, which extend transversely of the vehicle and are mounted on the top of the crossbar 19. The two belt eyelets 27 are spaced apart from one another, specifically each with slight spacing from a longitudinal center plane C—C of the vehicle. Each eyelet 27 has a narrow vertical recess 28 on its top, through which the belt 9 can be threaded. The deflector element 14 may, however, be formed by a deflector fitting, guide part of plastic or the like, so as to be mountable in an upper region of the support frame 17, located approximately at shoulder level.

Figure 3:
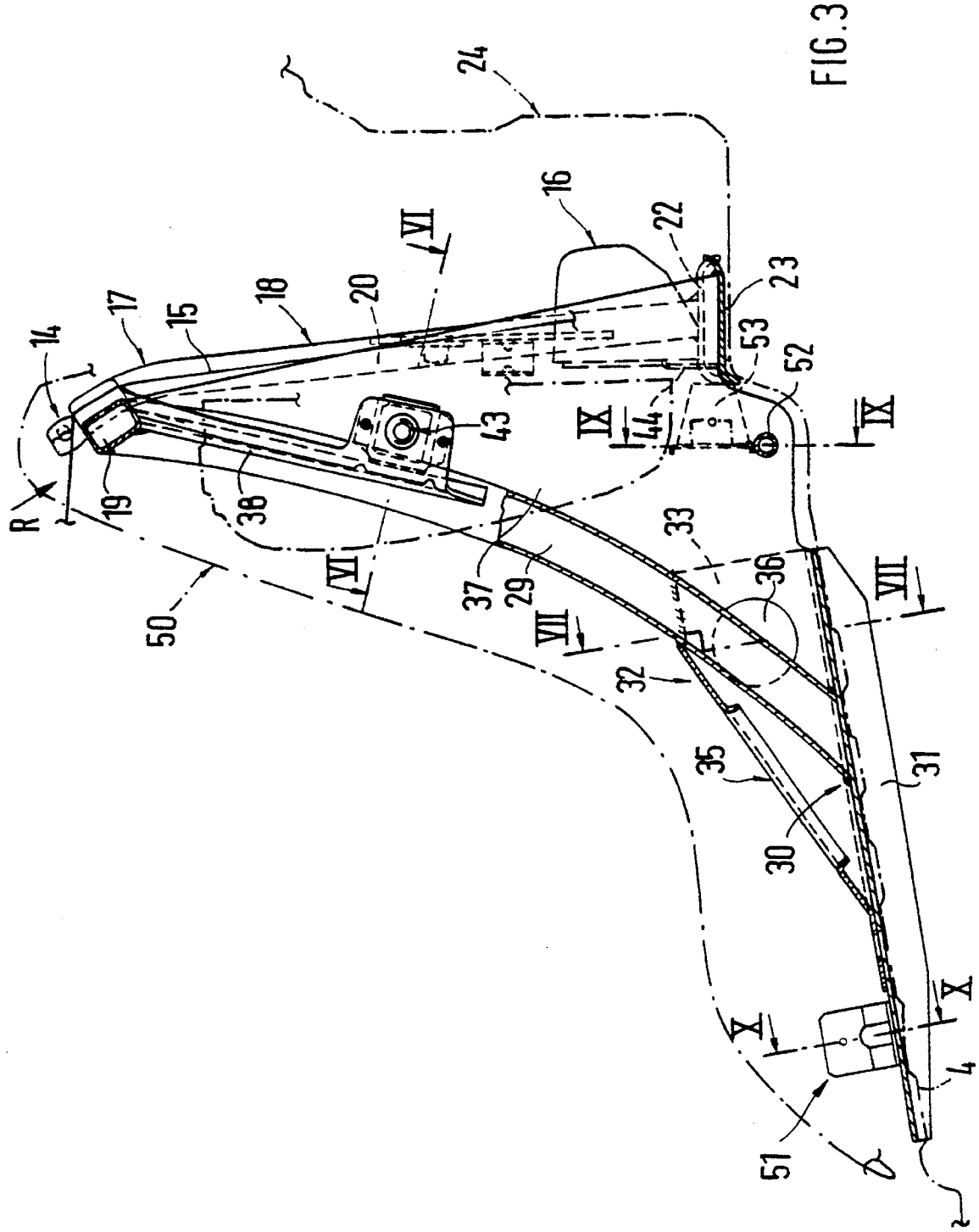
FIG. 3 is a sectional view taken along line III—III of FIG. 2, showing the support frame but with the covering in dot-dash lines.
Figure 4:
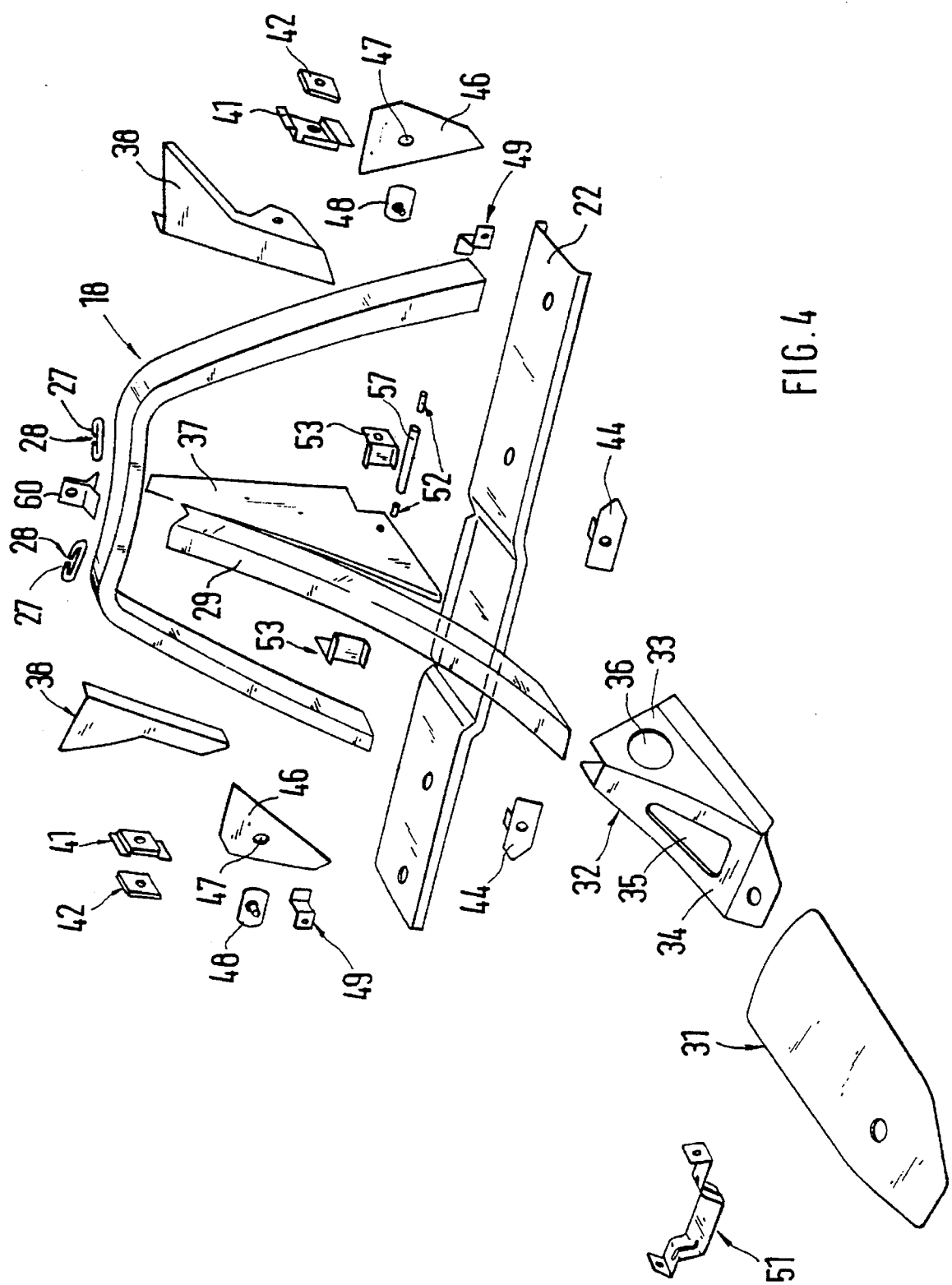
FIG. 4 is an exploded perspective view of the individual parts of the support frame without the covering.

For absorbing major forces, a support strut 29 protruding forward and downward is extended away from a middle region of the upper crossbar 19, approximately in a center longitudinal plane C—C of the vehicle, and its lower end 30, located in front of the seat backs 6, that is frontward as viewed in the direction of the travel, is permanently connected to a large-area, longitudinally oriented retaining plate 31. The retaining plate 31 is adapted to the upper contour of the tunnel 4 and rests thereon. The support strut 29 may have a rectilinear or curved configuration as seen in side view (FIG. 3). The tubular yoke 18 and the support strut 29 are rectangular tubes, although tubes with some other cross section may, however, also be used for the tubular yoke 18 and support strut 29.

Figure 2:
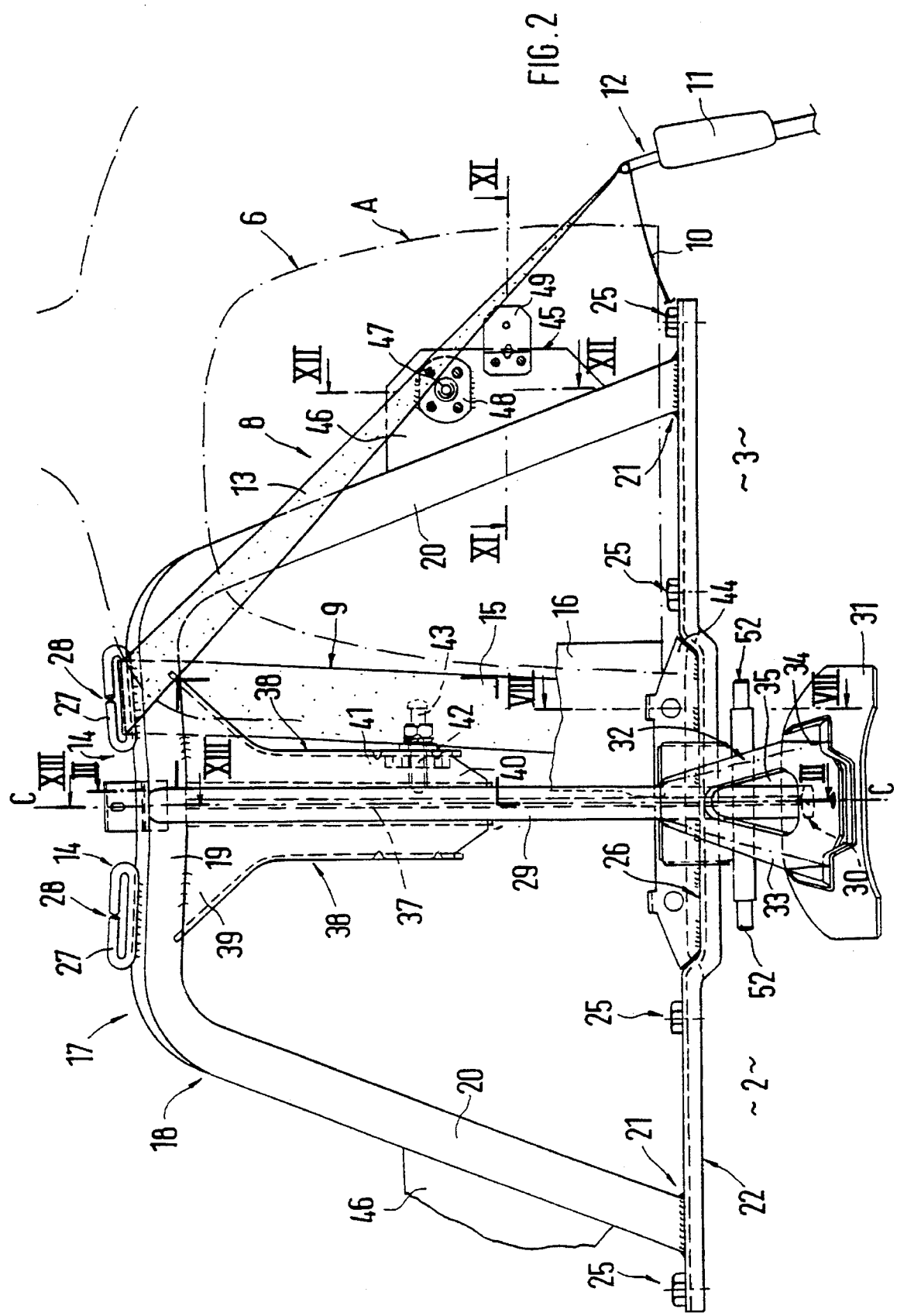
FIG. 2 is a front view of the support frame without the covering.
Figure 7:
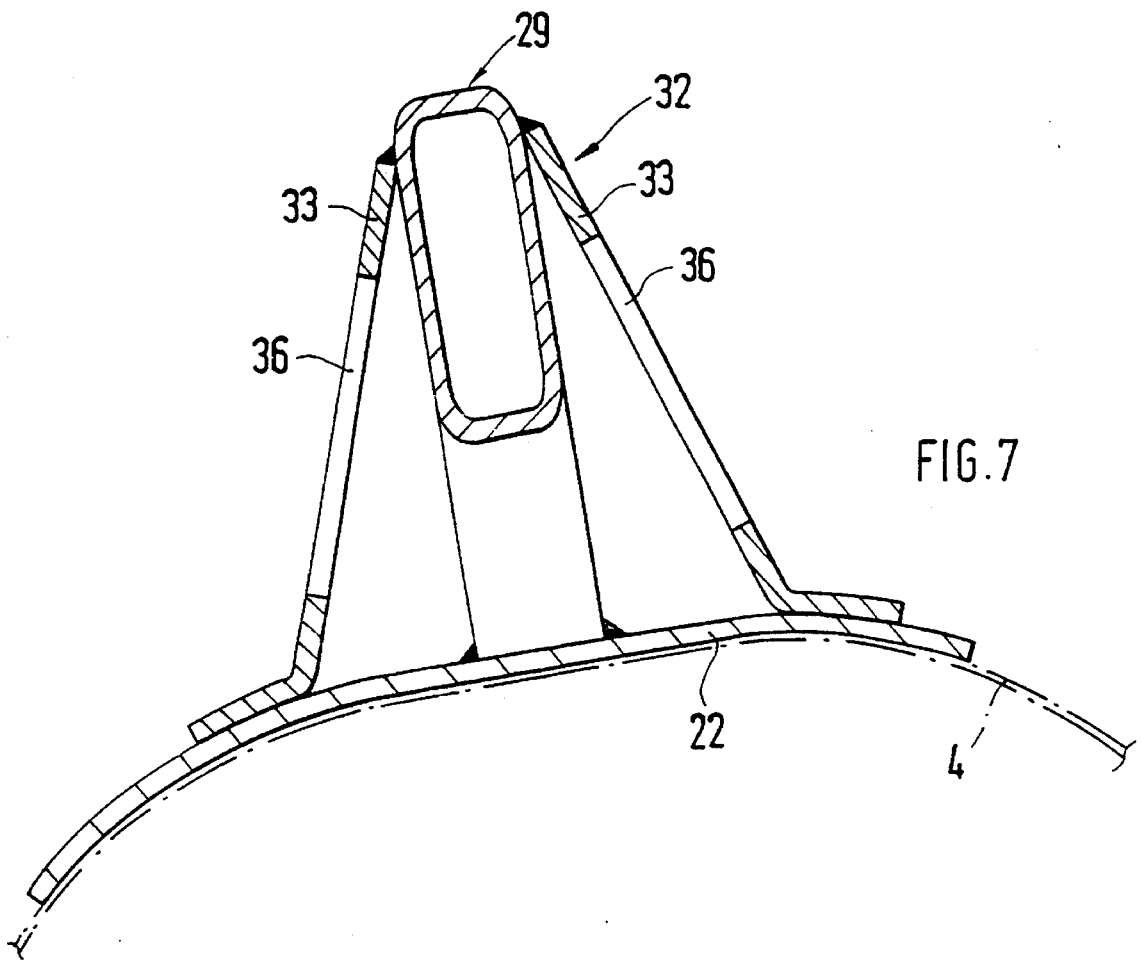
FIG. 7 is a sectional view taken along line VII—VII of FIG. 3 but on an enlarged scale.

For effective induction or introduction of force from the support strut 29 into the approximately horizontally oriented, longitudinally extending retaining plate 31, a shoelike element 32 is provided, which with the support strut 29 and the retaining plate 31 therebeneath forms a hollow-girder-like structure (FIGS. 2 and 7).

The shoelike element 32 becomes wider continuously from the support strut 29 to the retaining plate 31. Openings 35, 36 are provided on both side walls 33 of the element 32 and on the obliquely extending front side 34. At the side of the support strut 29 toward the back wall 24, a vertically oriented reinforcement plate 37 is connected to the support strut 29, the transversely extending securing plate 22, and the longitudinally oriented retaining plate 31. The reinforcement plate 37, as seen in side view, is approximately triangular in form. The side of the reinforcement plate 37 toward the support strut 29, as shown in FIG. 3, has a contour adapted to the curved course of the support strut 29.

Figure 6:
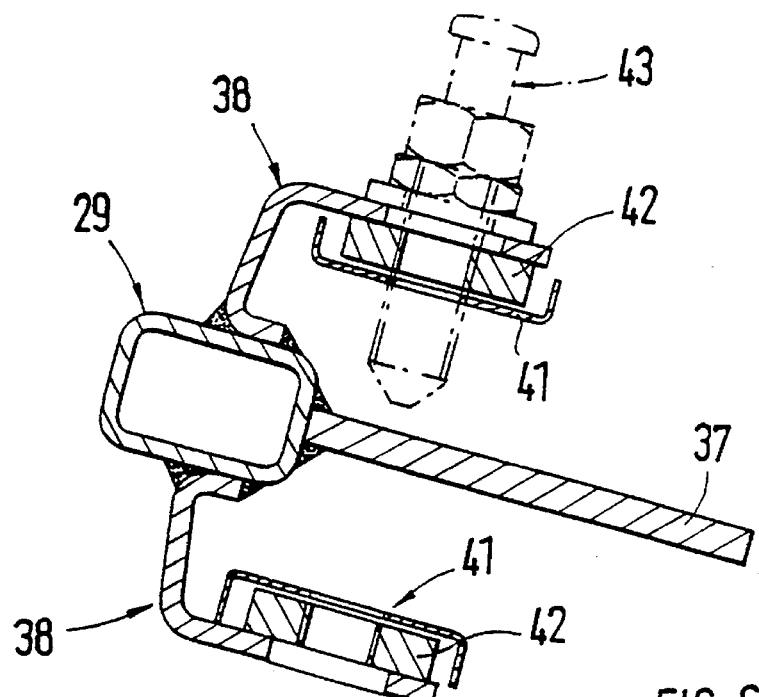
FIG. 6 is a sectional view taken along line VI—VI of FIG. 3 but on an enlarged scale.

Angular reinforcement elements 38 are also provided in an upper region on both sides of the support strut 29 and are connected to the underside of the transversely extending crossbar 19 and to the support strut 29. Upper triangular segments 39 of the reinforcement elements 38 extend over a substantial portion of the crosswise length of the crossbar 19. On a lower elongated segment 40 of the reinforcement elements 38, cages 41 with nuts 42 disposed therein are provided locally, with transversely extending locking bolts 43 inserted into these nuts. The locking bolts 43 are adjustable via locknuts, and as seen in FIG. 6 they serve to lock the pivotable seat backs 6 in their upright position of use A. The releasable locking devices for the two seat backs 6 are not shown in further detail. If the seat backs 6 are rigid instead, then they are permanently connected to the support frame 17 and to the body of the vehicle.

Figure 8:
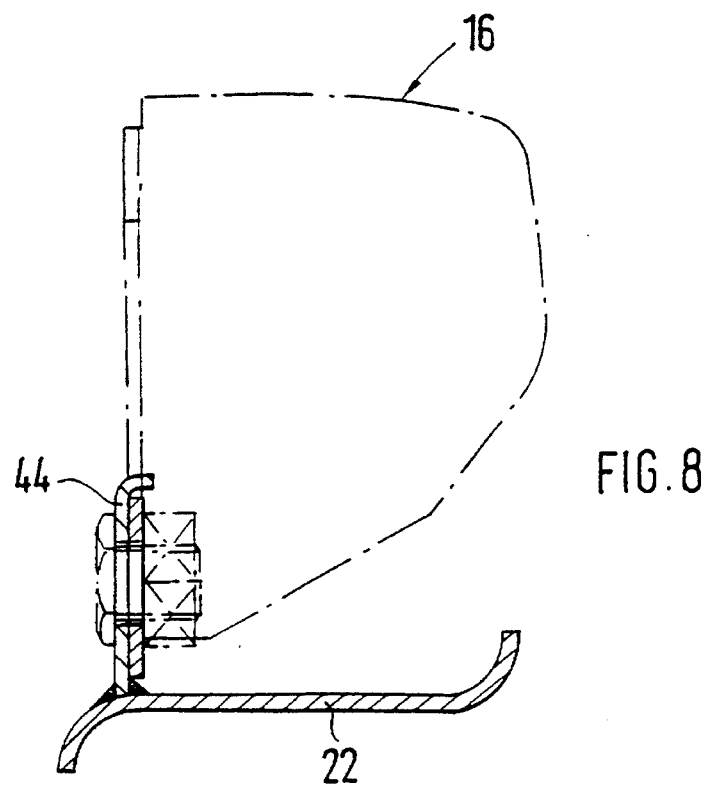
FIG. 8 is a sectional view taken along line VIII—VIII of FIG. 2 but on an enlarged scale.

In the region of the offset 26 of the securing plate 22, transversely extending upright mounts 44 are mounted on both sides of and are permanently connected to the vertical reinforcement plate 37, and also to the securing plate 22. At each mount 44, a lower belt winder 16 of the safety belt arrangement 8 is secured in the conventional way by screws, which are passed through an opening of the mount 44 (FIG. 8).

Figure 11:
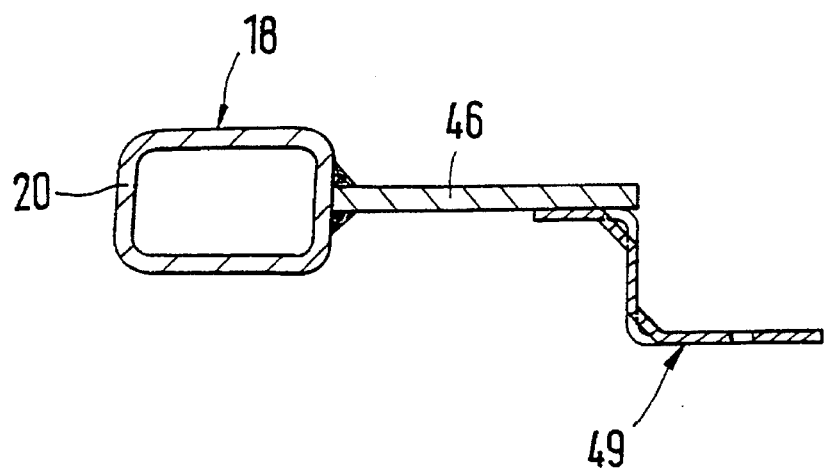
FIG. 11 is a sectional view taken along line XI—XI of FIG. 2 but on an enlarged scale.
Figure 12:
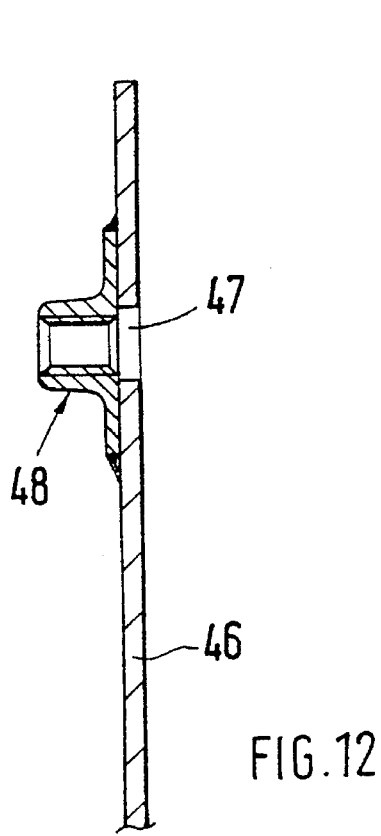
FIG. 12 is a sectional view taken along line XII—XII of FIG. 2 but on an enlarged scale.

Platelike parts 46 with local bores 47 are welded to a lower region 45 of each of the obliquely extending arms 20 of the tubular yoke 18 and extend outwardly away from the arm 20. A receiving part 48 with an internal thread is welded to one side of the part 48, specifically in the region of the bore 47 (FIGS. 11 and 12). The receiving parts 48 serve to secure child restraint systems of the rear seat system 1. Securing angle brackets 49 are also mounted to the plate-like parts 46 and serve to hold a covering 50 for the support frame 17. An additional securing angle bracket 51 for the covering 50 is disposed in the front region of the retaining plate 31 as shown in FIG. 3.

Figure 9:
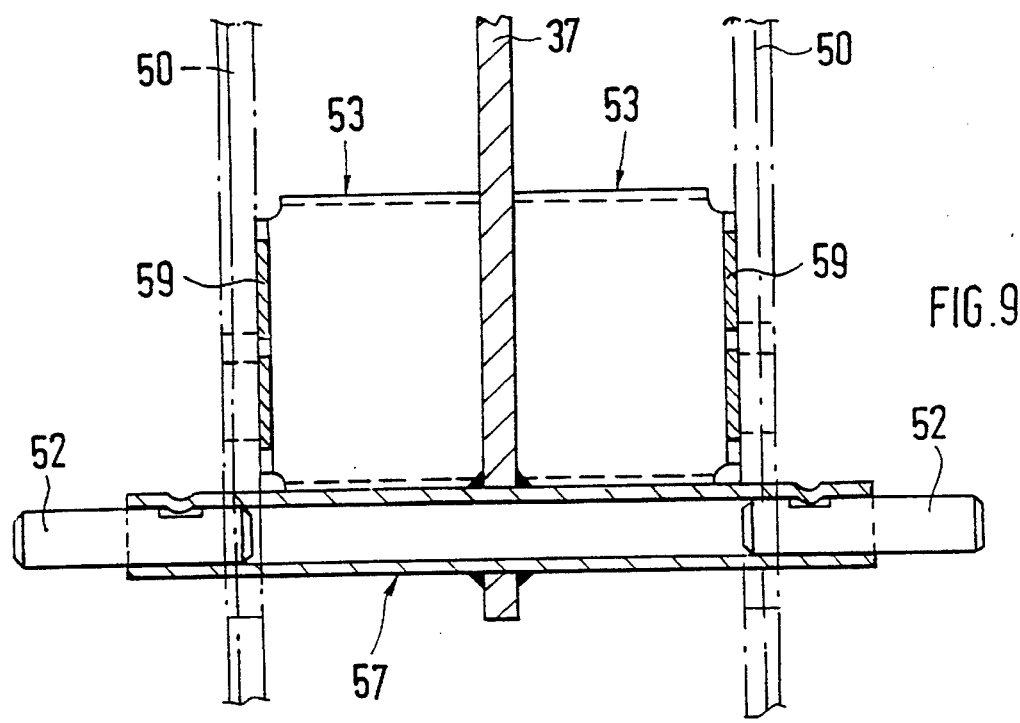
FIG. 9 is a sectional view taken along line IX—IX of FIG. 3 but on an enlarged scale.
Figure 10:
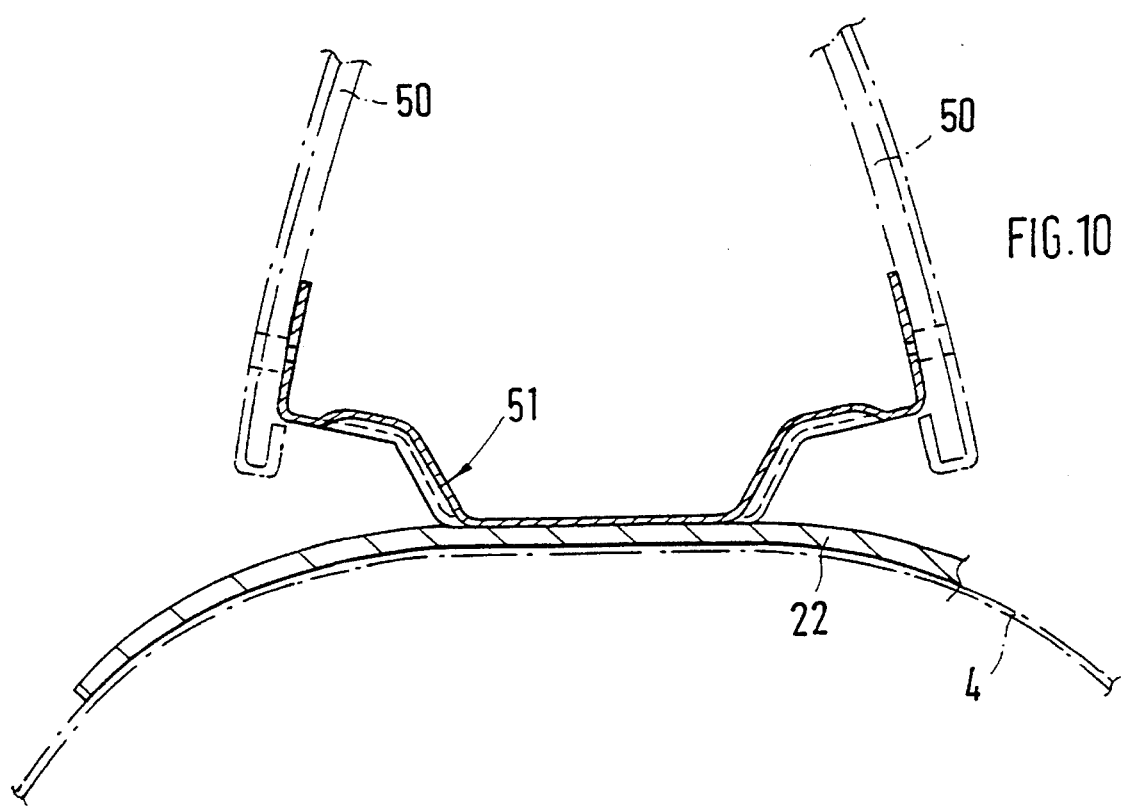
FIG. 10 is a sectional view taken along line X—X of FIG. 3 but on an enlarged scale.

Transversely extending, horizontally-oriented journal pins 52 for both seat backs 6, and angle brackets 53 disposed thereabove, are provided in a lower region of the vertical reinforcement plate 37. The two journal pins 52 are provided on the ends of a transversely extending tube 57 which passes through the vertical reinforcement plate 37 and is permanently connected thereto. The tube 57 extends crosswise to the vehicle travel direction and is oriented approximately horizontally. The journal pins 52 are inserted into open end segments of the tube 57 and are connected permanently to the tube 57 (FIG. 9). The angle brackets 53 on which the covering 50 is held in position by securing screws are mounted on the tube 57. All the individual parts of the support frame 17 are connected to one another, preferably by welding.

The covering 50 is mounted on the support frame 17 from above and is detachably connected to the support frame 17 in the region of the securing angle brackets 49, 50 and angle brackets 53, 60. As shown in FIG. 9, the angle brackets 53 are welded to the tube 57 and also to the reinforcement place 37. The covering 50 rests on longitudinally oriented arms 59 of the angle bracket 53 and is kept in position by screws (schematically shown).

Figure 13:
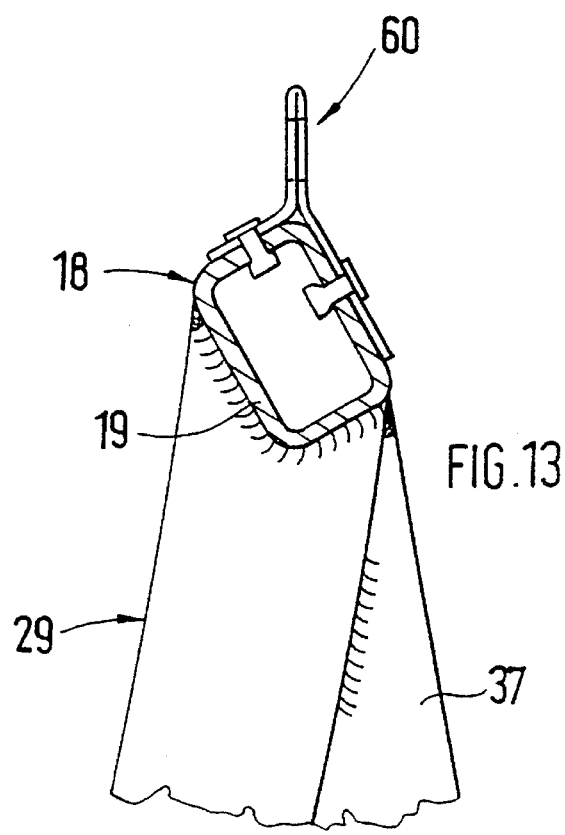
FIG. 13 is a sectional view taken along line XIII—XIII of FIG. 2 but on an enlarged scale.
Figure 14:
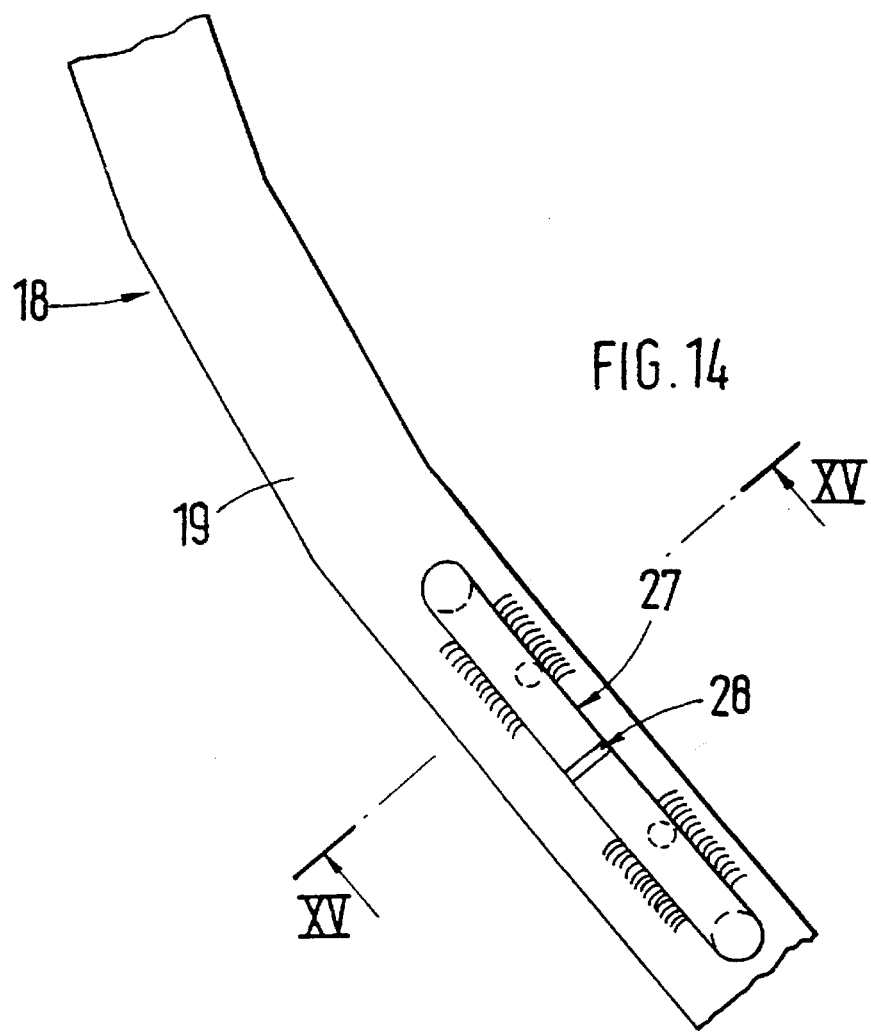
FIG. 14 is a view in the direction of arrow R of FIG. 3 but on an enlarged scale.

Another angle bracket 60 for the covering 50 is provided on the top side of the crossbar 19, between the two eyelets 27. The angle bracket 60 rests on the crossbar 19 with differently offset flanges and is connected to the crossbar by riveting, welding or the like as seen in FIG. 13.

Figure 5:
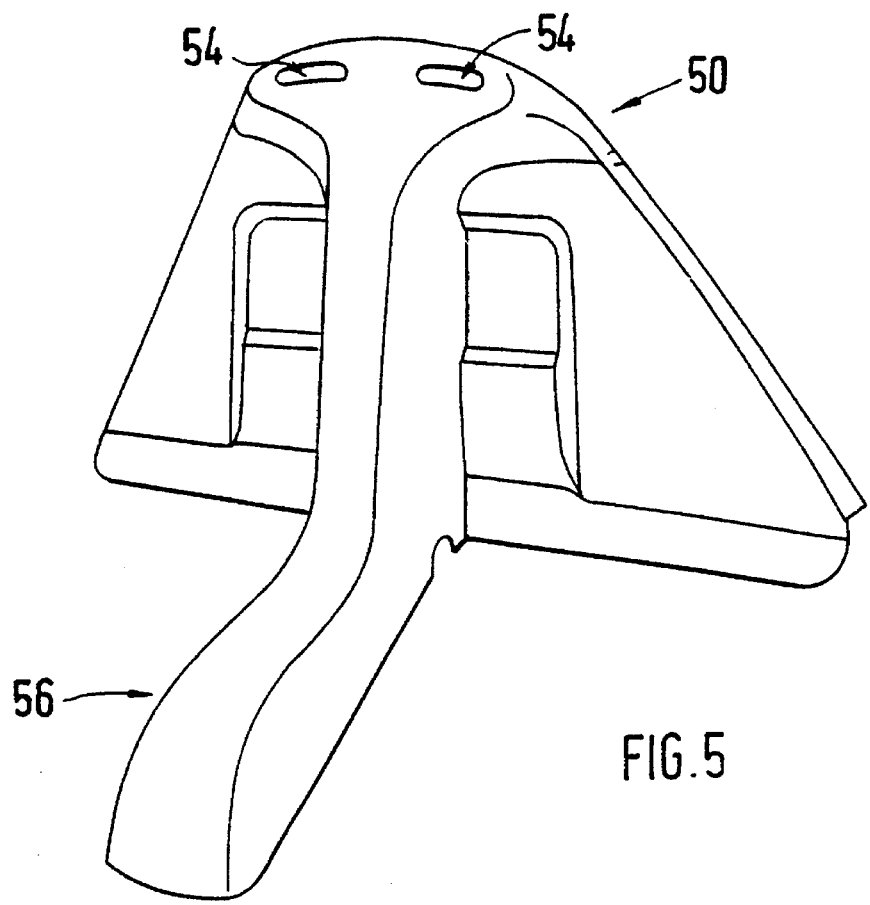
FIG. 5 is a perspective front view of the covering of the support frame.

FIG. 5 shows that the covering 50 is adapted to the contour of the support frame 17, the adjoining seat backs 6 and the tunnel 4, and fits harmoniously into the design of the rear seat system 1. Next to the belt eyelets 27 of the support frame 17, the covering 50 has two spaced-apart slitlike outlet openings 54. A collar 55 of plastic or other suitable material, surrounding the belt strap, is inserted into each outlet opening 54.

The outlet openings 54 and the upper deflector elements 14 extend spaced apart from an upper boundary located therebelow, of the seat backs 6. A lower, longitudinally oriented segment 56 of the covering 50 extends, along the tunnel 4 that runs through the middle of the vehicle, approximately as far as the front edge of the seat cushions 7 located next thereto as shown in FIG. 1.

Figure 15:
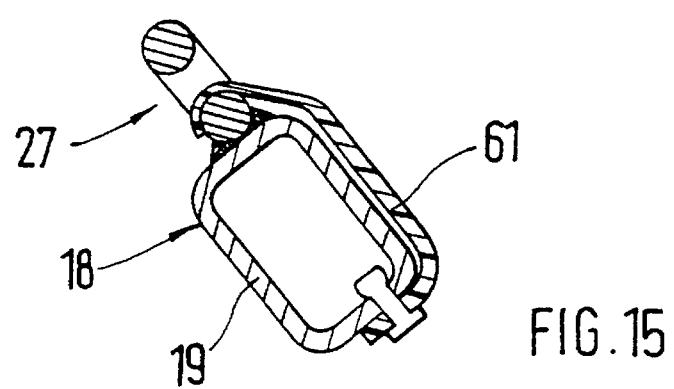
FIG. 15 is a sectional view taken along line XV—XV of FIG. 14.

Referring now to FIG. 15, plastic guide elements 61 are provided, for better guiding of the belt segment 15 in the region of the belt eyelets 27. These guide elements fit around a lower region of the eyelets 27 and extend behind the crossbar 19. The guide elements 61 are connected to the underside of the crossbar 19 by rivets. The belt segment 15 wraps against the guide elements 61 and is thereupon deflected.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A motor vehicle having two rear seats, a longitudinally oriented tunnel portion and a back wall having a transversely and horizontally extending bottom segment, the motor vehicle further comprising a safety belt assembly including:

two safety belts, the safety belts adapted to extend diagonally across a passenger;

a support frame, the support frame comprising an approximately U-shaped tubular yoke including a transversely extending crossbar and two arms extending obliquely downwardly and outwardly from the transversely extending crossbar;

two retractors, the retractors winding up the safety belts and being mounted on the support frame;

two deflector elements for guiding the safety belts, the deflector elements being connected to the transversely extending crossbar, wherein the deflector elements are annular belt eyelets extending in the transverse direction of the vehicle and each eyelet having one recess for introduction of the belt;

a transversely extending plate seated on the bottom segment of the rear wall of the vehicle, the arms of the yoke having lower ends permanently connected to transversely extending plate;

a covering adapted to the contour of the support frame and including two spaced outlet openings adjacent to the eyelets for passage of the safety belts.

2. The motor vehicle of claim 1, wherein a curved support strut, oriented downwardly and toward the front of the vehicle, is extended away from a middle region of the crossbar of the tubular yoke, the lower end of the support strut, located in front of seat backs of the seats, being fixed to a longitudinally oriented retaining plate seated and secured on the tunnel.

3. The motor vehicle of claim 1, wherein the tubular yoke and the support strut are curved rectangular tubes.

4. The motor vehicle of claim 2, wherein an element is seated on a lower end of the support strut, and is permanently connected to the support strut and the retaining plate, the element widening continuously toward the retaining plate, with the support strut and the retaining plate forming a hollow, girder-like structure.

5. The motor vehicle of claim 2, wherein a vertically oriented reinforcement plate is connected to a side of the support strut oriented toward the back wall and is fixed to the support strut, the transversely extending securing plate, and the longitudinally oriented retaining plate.

6. The motor vehicle of claim 2, wherein in an upper region on both sides of the support strut, respective reinforcement elements are fixed to the underside of the transversely extending crossbar and to outer sides of the support strut.

7. The motor vehicle of claim 6, wherein the reinforcement elements have adjustable locking bolts extending transversely of the vehicle to effect locking of the seat backs in upright position.

8. The motor vehicle of claim 6, wherein transversely extending mounts are attached to the securing plate of the support frame on sides of the vertical reinforcement plate, and the retractors are secured to the mounts.

9. The motor vehicle of claim 1, wherein securing angle brackets and angle brackets for retaining the covering are provided locally at the support frame.

* * * * *